United States Patent [19]

Chekouras

[11] Patent Number: 4,564,075

[45] Date of Patent: Jan. 14, 1986

[54] SPRING-LOADED TILLAGE IMPLEMENT

[76] Inventor: Carl J. Chekouras, 3207 Post Rd., Stevens Point, Wis. 54481

[21] Appl. No.: 596,410

[22] Filed: Apr. 3, 1984

[51] Int. Cl.$^4$ .............................................. A01B 61/04
[52] U.S. Cl. .................................... 172/572; 172/710; 267/20 R
[58] Field of Search ............... 172/573, 572, 705, 710, 172/260.5, 551; 267/20 R, 20 A

[56] References Cited

U.S. PATENT DOCUMENTS

| | | | |
|---|---|---|---|
| 1,359,055 | 11/1920 | Graham | 172/705 X |
| 1,752,694 | 4/1930 | Recchia | 267/20 R |
| 2,654,967 | 10/1953 | Small | 172/710 |
| 3,319,589 | 5/1967 | Moran | 172/573 |
| 3,601,201 | 8/1971 | Schmitz | 172/551 |

FOREIGN PATENT DOCUMENTS

105671  4/1917  United Kingdom ................ 172/572

*Primary Examiner*—Richard J. Johnson
*Attorney, Agent, or Firm*—Isaksen, Lathrop, Esch, Hart & Clark

[57] ABSTRACT

A tillage implement for attachment to agricultural soil cultivation machinery. The tillage implement includes a knee having a knee body adapted to be attached to the agricultural machinery. A pivot arm is pivotably attached to the knee body and moves between down and up positions. A tillage blade is rotatably attached to the downward end of the pivot arm and is adapted to roll over and engage the soil being cultivated. A spring is adapted to apply pressure directly to the pivot arm to bias the downward end thereof toward its down position, the knee being adapted to contain and substantially enclose the spring to protect the spring from becoming fouled with foreign matter.

15 Claims, 5 Drawing Figures

SPRING-LOADED TILLAGE IMPLEMENT

TECHNICAL FIELD

The present invention relates to tilling machinery in general and, in particular, to coulters and similar implements adapted to be used with such tilling machinery.

BACKGROUND OF ART

Tilling and other farm machinery adapted to be drawn through the soil to plow, till, inject, harrow, or otherwise treat or modify the soil is subject to hazards presented by various obstacles in the soil. Rocks, roots, hardpan, sod, and residual stubble and other plant material remaining in the soil (all of which shall be hereinafter referred to as "trash") can impede and foul such equipment and even can break it. To help minimize these problems, coulters are conventionally mounted in front of such ground-engaging equipment.

Coulters employ rotary, disc-shaped knives adapted to roll over the ground in the direction of travel of the equipment. The rotary knives are thrust into the soil for a selected distance to cut trash, ensuring a relatively clear route for the tillage equipment that follows.

For various reasons, it is desirable that the rotary knives of coulters be pressed into the ground by a spring or comparable resilient means. Preferably, when a plurality of coulters are employed on a single piece of tillage equipment that is comparatively wide each coulter is individually biased against the ground by such a spring. By this means, each coulter separately moves up and down to follow unevennesses in the ground being tilled. In addition, if the blade of a spring-biased coulter encounters an obstacle it cannot cut, it can be so adapted as to travel up and over the obstacle, thereby avoiding damage to the coulter. Some of these same considerations also apply to discs, rotary hoes, and other tilling devices in which a tillage blade rolls over and cuts or pierces into the soil.

Those skilled in the art are cognizant of a variety of spring mountings adapted to resiliently press the rotary blade of a coulter or similar implement into the ground. Examples include Lambert, U.S. Pat. No. 636,342, Taylor, U.S. Pat. No. 1,642,908, Hentrich, U.S. Pat. No. 3,700,037, Washburn, U.S. Pat. No. 3,589,449, Siekmeier, U.S. Pat. No. 3,967,685, and Whalen, U.S. Pat. No. 4,194,575. In each of these patents single coulters or similar, disc-shaped tillage tools are biased against the ground by springs arranged in a variety of ways. Comparable devices are currently being marketed, including coulters sold by Wil-rich, Inc., Wahpeton, N. Dak., and incorporated in that company's coulter chisel plow Model No. CA10CPW10 and related plows and on the Wil-rich mold board plows of which Model No. 2940-500(AR) is typical. Yetter Manufacturing Company of Colchester, Ill., sells such structures for application to chisel plows and the like as Model No. 2930 (straight shank) and 2950 (offset shank) disc-chisels. A comparable device is sold by Thurston Mfg. Co. of Thurston, Nebr. as a "Spring-cushioned Plow Coulter." A spring-loaded coulter assembly is also shown as part of pull-type liquid ammonia applicators sold as Model No. 4200 by DMI, Inc. of Goodfield, Ill. Parker, U.S. Pat. No. 1,621,739 shows a spring loading of an entire gang of discs to cause the gang to be pressed into the soil under resiliently applied pressure.

In all of the spring-biased coulter or coulter-like structures referred to above, the spring is exposed. As a consequence, the spring may become fouled with mud, trash, or other material. When this occurs, movement of the spring can be restricted or even prevented until it becomes at least no more than semi-functional. Such fouling requires that tillage be interrupted while the machinery is cleaned out. The resulting down time can be significant, especially when tillage conditions are unfavorable. The increased use of large tractors pulling wide cultivation machinery having many spring-loaded discs, coulters, or the like makes the problem even more serious. The opportunities for fouled springs are multiplied, and the cost of down time is likewise multiplied, as the entire rig is stopped even to clean isolated fouled springs.

Price, Jr., U.S. Pat. No. 2,588,872, and Whisenant, U.S. Pat. No. 2,851,939 show spring-loaded, disc-shaped tillage implements in which the spring is enclosed in a housing that thus protects it from fouling. In Whisenant the spring merely cushions the drop of a furrow wheel when a disc or plow employing the furrow wheel is lifted from the ground. In Price, however, a spring within a housing is used to bias a gang of discs against the ground. However, whereas most of the spring-urged coulters and tillage implements referred to above provide for a backward and upward movement of a pivotably mounted coulter or tillage blade as it encounters and rides up and over an obstacle, the arrangement shown in Price is limited to vertical movement of a telescoping shaft on which a gang of discs is mounted.

BRIEF SUMMARY OF THE INVENTION

The present invention is summarized in that a tillage implement for attachment to agricultural soil cultivation machinery includes a knee having a knee body adapted to be attached to the agricultural machinery. A longitudinally extended pivot arm having a downward end and an upward end is pivotably attached to the knee body at a point between the downward and upward ends. The pivot arm is adapted to so move that the downward end moves between down and up positions such that the downward end is at positions respectively of greatest descent and ascent. A tillage blade is rotatably attached to the downward end of the pivot arm and is adapted to roll over and engage the soil being cultivated. A spring is adapted to apply pressure directly to the pivot arm to bias the downward end thereof toward its down position, the knee being adapted to contain and substantially enclose the spring to protect the spring from becoming fouled with foreign matter.

A primary object of the invention is to provide a spring-loaded tillage implement adapted to be resiliently urged against the ground being cultivated.

A second object of the invention is to provide for such an implement adapted to ride up and over obstacles of sufficient resistance, to thus avoid breakage or snagging.

Another object of the invention is to provide such a tillage implement resistant to being fouled or clogged by mud, trash, and the like.

Another object of the invention is to provide such a tillage implement having relatively few moving parts and a minimum of mechanical linkages.

A further object of the invention is to provide such a tillage implement that may be disassembled for servicing with a minimum of effort and with few tools.

DETAILED DESCRIPTION OF THE PREFERRED EMBODIMENT

Figure 1:
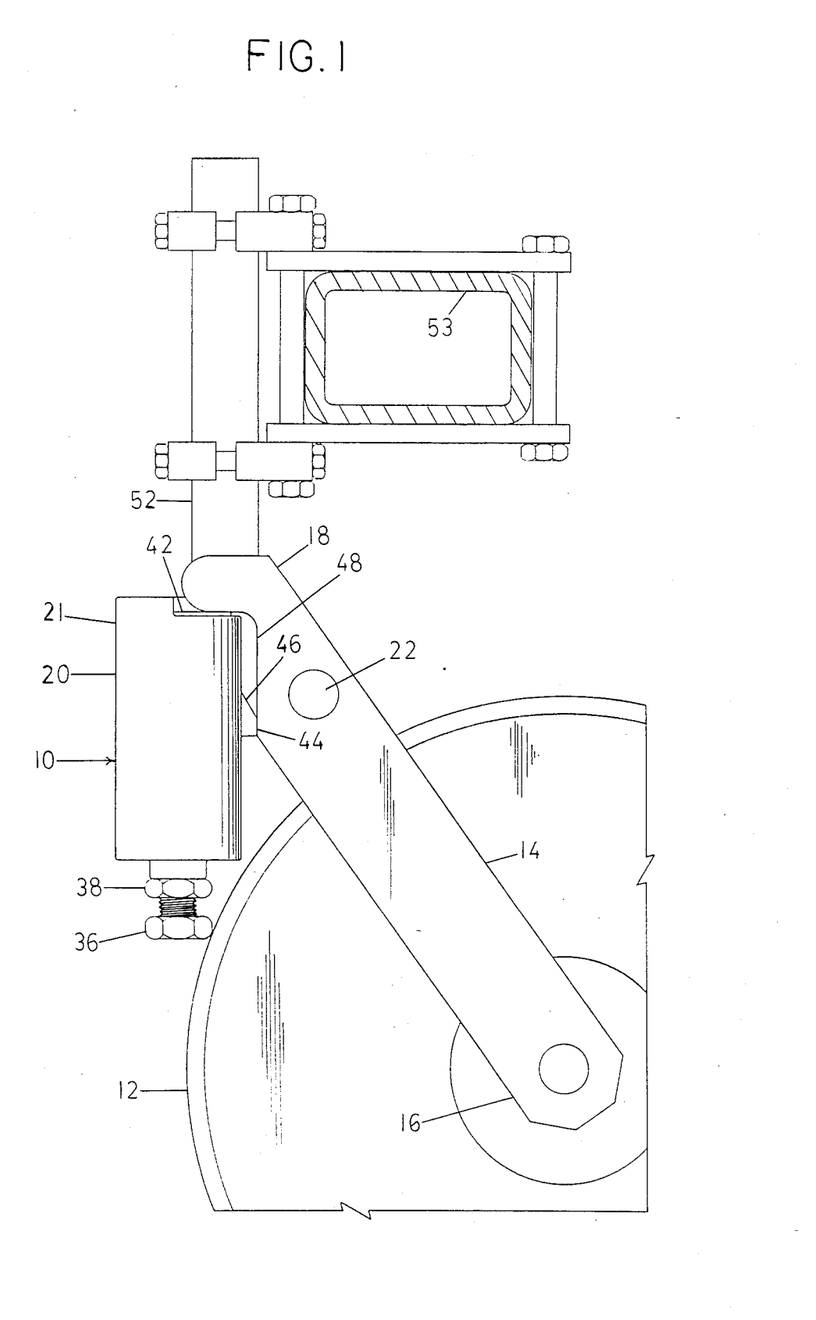
FIG. 1 is a side elevation view of a tillage implement constructed in accord with the present invention mounted on a mounting bar of a piece of soil cultivation machinery.

Referring more particularly to the drawings, wherein like numbers refer to like parts, FIG. 1 shows a tillage implement, generally indicated at 10, constructed in accord with the present invention. The tillage implement has a tillage blade 12 adapted to engage and till the ground as the blade rolls over and through the soil. The tillage blade 12 shown in the Figures is a conventional coulter blade, basically constituting a rotary knife. However, the tillage blade 12 could alternatively be a disc plow blade, a rotary hoe blade, or any blade adapted to till the soil while the blade is rolling over the ground and to engage the soil with the plane of the blade being generally held upright with respect to the plane of the soil being tilled and generally parallel to the direction of movement of the tillage implement. The tillage implement 10 is adapted to be mounted on agricultural soil cultivation machinery, such as a plow, planter, liquid ammonia applicator, or the like.

The tillage implement 10 further includes a pivot arm 14, a knee 20, means for attaching the knee to the frame of the plow or other machinery on which the tillage implement is mounted, and means for resiliently biasing the tillage blade downwardly and against the ground. The pivot arm 14 is longitudinally extended and has a downward end 16 and upward end 18. The tillage blade 12 is rotatably mounted on the downward end 16 of the pivot arm 14. The pivot arm 14 is pivotably mounted on the knee 20 at a point remote from the downward end 16 of the pivot arm. The means for resiliently biasing the tillage blade 12 downwardly and against the ground is adapted to allow the pivot arm 14 to rotate about its point of attachment to the knee 20 so as to move the tillage blade in the desired direction.

The knee 20 has a knee body 21 having a knee spindle hole 24 extending generally transverse to the plane of the tillage blade 12, The pivot arm 14 has a knee spindle 22 that extends transversely to the pivot arm and is rigidly attached thereto. The knee spindle 22 is adapted to be received in the knee spindle hole 24 in freely rotating relation. The knee spindle 22 preferably extends entirely through the knee body 21 and is retained in the knee spindle hole 24 by a cotter pin 25. By this means, the pivot arm 14 is pivotably attached to the knee 20 and is constrained to move within a plane oriented at right angles to the knee spindle 22.

Figure 2:
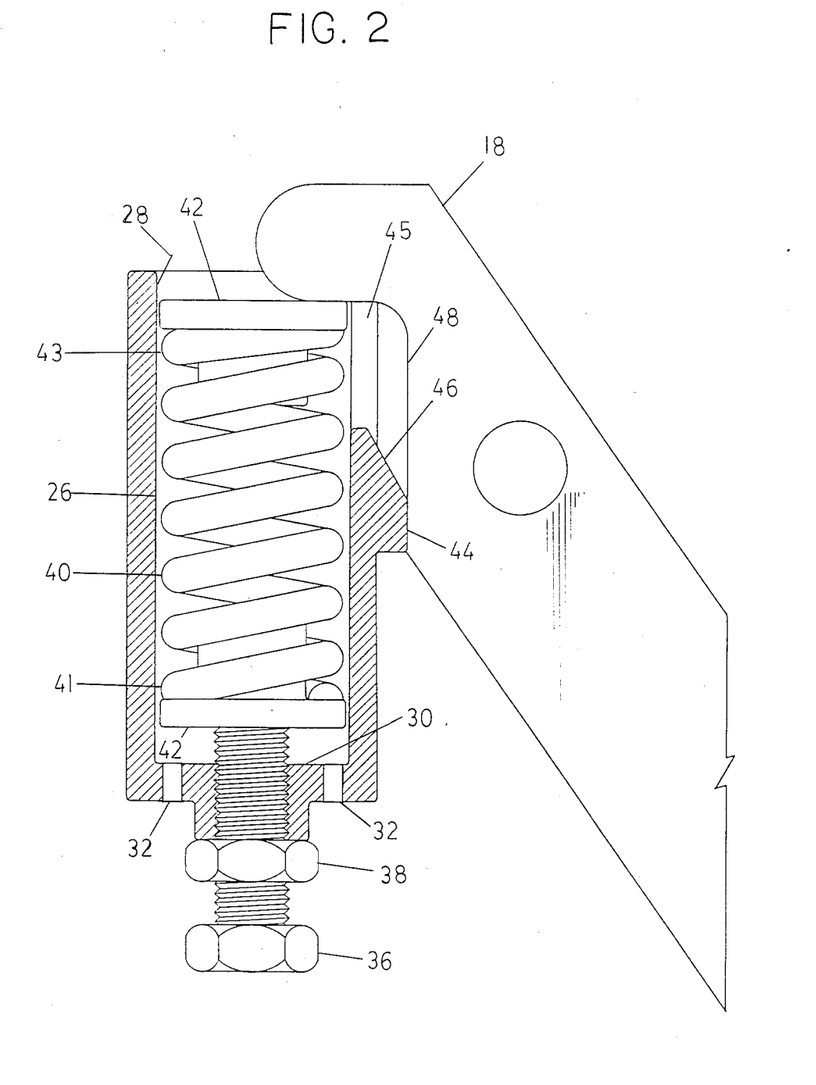
FIG. 2 is a side elevation view of the knee and associated parts of the tillage implement of FIG. 1 with parts broken away and the pivot arm in a downwardly extended position.
Figure 3:
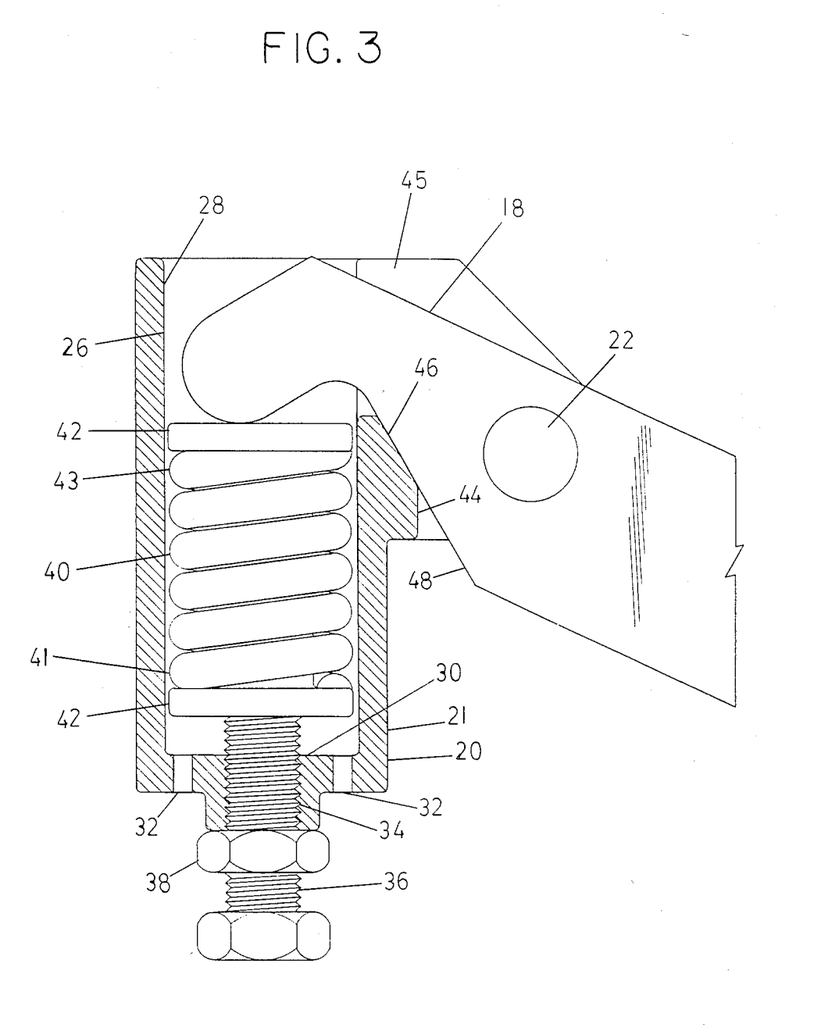
FIG. 3 is a side elevation view corresponding to Fig. 2 but with the pivot arm in its upwardmost position.
Figure 4:
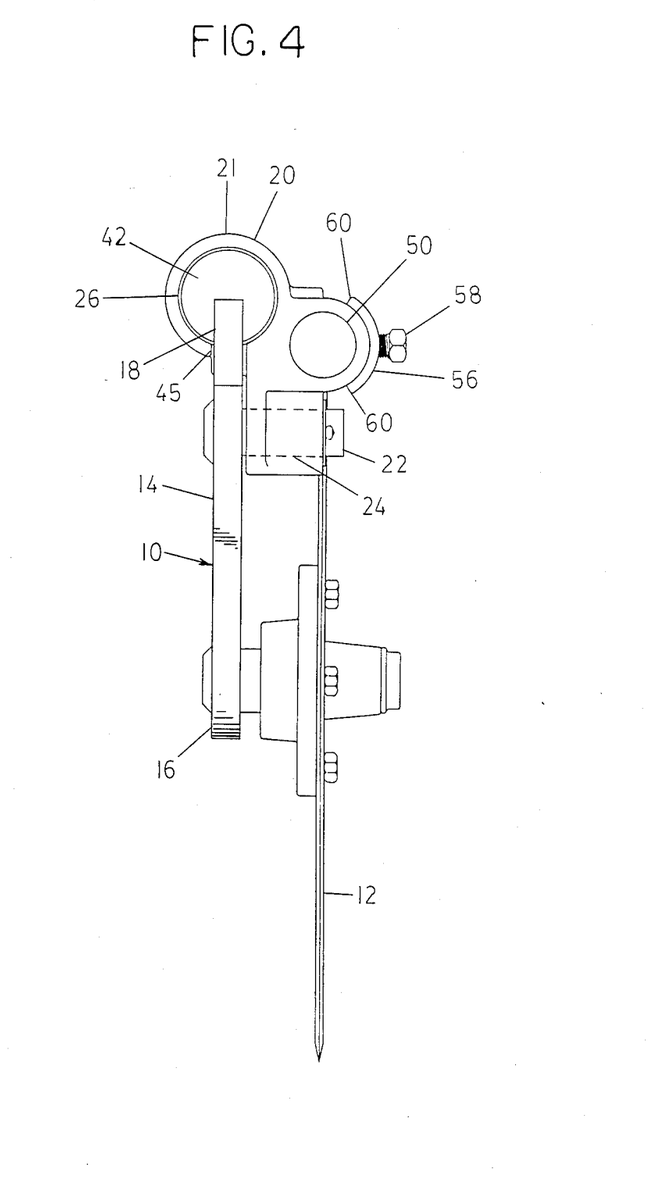
FIG. 4 is a top plan view of the tillage implement of FIG. 1 removed from the mounting post of the soil cultivation machinery.

The knee body 21 also includes a longitudinally extended spring channel 26, the longitudinal axis thereof lying substantially within the plane within which the movement of the pivot arm 14 is constrained. The pivot arm 14 is adapted to move about the knee spindle 22 between a down position, shown in FIG. 2, wherein the longitudinal axis of the pivot arm most nearly approaches the vertical and the blade 12 is held in a position of maximum descent, and an up position, shown in FIG. 3, wherein the longitudinal axis of the pivot arm most nearly approaches the horizontal and the blade is held in a position of maximum ascent. As will be further described below, the pivot arm 14 is constrained so as not to move beyond the down and up positions. Preferably, when the pivot arm 14 is in the down position, it is oriented at from 0° to 65° from the vertical and preferably at about 35° thereto. In the upward position, the pivot arm 14 is preferably oriented at from 35° to 90° from the vertical and preferably at about 65° thereto. The longitudinal axis of the spring channel 26 is so oriented that it is never parallel to the longitudinal axis of the pivot arm 14 at any point as the pivot arm moves between the up and the down positions. Preferably, the spring channel 26 is oriented vertically.

The spring channel 26 is cylindrical and has an open end 28 generally presented toward the upward end 18 of the pivot arm 14. The spring channel 26 has a floor 30 closing the spring channel at a point remote from the open end 28. Preferably the floor 30 has weep holes 32 extending therethrough to allow for the exchange of air and the drainage of water, oil, and grease from the spring channel 26. The floor 30 further has a threaded hole 34 extending therethrough, coaxial with the spring channel 26. A bolt 36 is engaged in threaded relation in the threaded hole 34 and is adapted to be adjusted by being turned so as to extend through the floor and into the spring channel to selected greater and lesser extents. A lock nut 38 is threadedly engaged on the bolt 36 and is adapted to be turned against the knee body 21 to lock the bolt in a given position.

A compression spring 40 is coaxially mounted within the spring channel 26. For purposes of description, the ends of the spring 40 nearest the floor 30 and the open end 28 of the spring channel 26 shall be referred to as the spring's constrained and free ends 41, 43, respectively. Preferably an end cap 42 covers each end of the compression spring 40, the end cap covering the constrained end 41 being in contact with the bolt 36 as it extends into the spring channel 26. Thus, with the free end 43 of the spring 40 held fixed, the spring 40 may be placed under more or less compressive tension as the bolt 36 is turned in or out of the spring channel 26.

The upward end 18 of the pivot arm 14 is adapted to remain in contact throughout its range of movement with the end cap 42 of the free end 43 of the spring 40, which is presented toward the open end 28 of the spring channel 6. The end cap 42 substantially closes and slides within the spring channel 26 to keep out soil, trash, and other extraneous material that might otherwise foul the spring channel or the spring 40. Preferably the knee body 21 includes first and second stop surfaces 44, 46. The first stop surface 44 is adapted to contact a portion of the pivot arm 14 when the tillage blade 12 is moved to its down position and to prevent further movement beyond that position. The second stop surface 46 likewise contacts a selected portion of the pivot arm 14 when the tillage blade 12 is moved to its up position, preventing further motion in that direction.

The compression spring 40 is adapted to bias the pivot arm 14 toward contact with the first stop surface 44. Consequently, the tillage blade 12 is biased toward its down position. As the tillage blade 12 and pivot arm 14 move toward the up position, the upward end 18 of the pivot arm presses against the end cap 42 with which it is in contact, compressing the compression spring 40 either until equilibrium is achieved or the pivot arm comes into contact with the second stop surface 46. Preferably the spring channel 26 has an access slot 45 extending from the open end 28 parallel to the longitudinal axis of the spring channel. The upward end 18 of the pivot arm 14 may extend through the slot 45 in freely sliding relation to gain access to the free end 43 of the spring 40 to depress it as a consequence of movement of the pivot arm.

In the preferred embodiment, the first stop surface 44, is parallel to the longitudinal axis of the spring channel 26, and the upward end 18 of the pivot arm 14 includes a pivot arm contact surface 48 adapted to be parallel to and in contact with the first stop surface 44 when the tillage blade 12 is in its down position. The first stop surface 44 and pivot arm contact surface 48 are so located relative to each other and to the longitudinal axis of the knee spindle 22 that the first stop surface extends insufficiently toward the open end 28 of the spring channel 26 to intersect a line drawn from the longitudinal axis of the knee spindle 22 toward the spring channel 26 at a right angle to the first stop surface. As a consequence, as the pivot arm 14 pivots on the knee spindle 22, the pivot arm contact surface 48 draws away from the first stop surface 44, allowing unimpeded movement of the pivot arm as the blade 12 moves toward its up position.

The pivot arm contact surface 48 is adapted to contact the second stop surface 46 when the blade 12 has reached its up position. The second stop surface 46 is so located relative to the longitudinal axis of the knee spindle 22 and the pivot arm contact surface 48 that a line drawn from the longitudinal axis of the knee spindle at a right angle to the second stop surface toward the spring channel 26 does not intersect the second stop surface but instead passes to that side of it which is remote from the open end 28 of the spring channel. Consequently, the movement of the pivot arm 14 is unimpeded as the blade 12 is moved from its up position toward its down position.

Figure 5:
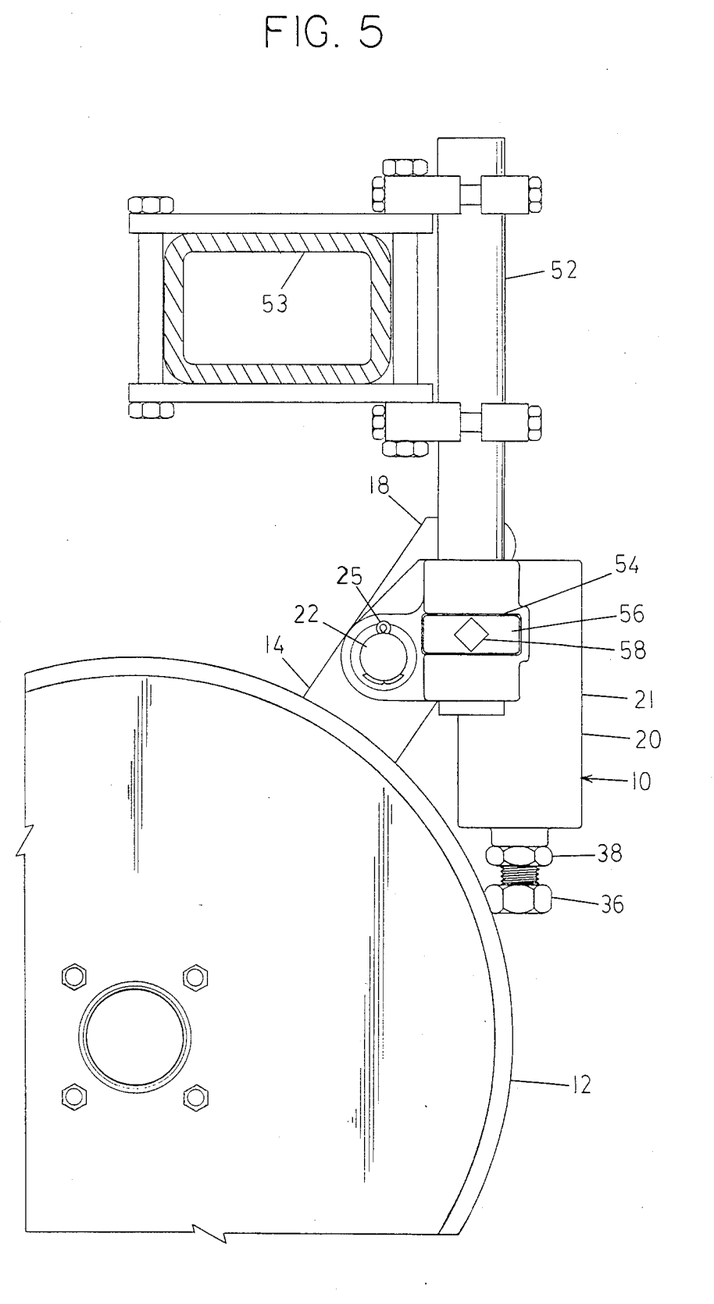
FIG. 5 is a side elevation view of the tillage implement of FIG. 1 shown from the side opposite to that shown in FIG. 1 and mounted as in FIG. 1 on the mounting bar of a piece of soil cultivation machinery.

The tillage implement 10 is adapted to be mounted on agricultural soil cultivation machinery of various sorts. When so mounted, it is typically convenient that the tillage implement 10 be free to pivot or turn about a generally vertical axis. Therefore, preferably the knee 20 has a mounting channel 50 extending generally vertically through the knee body 21. A mounting post 52 is adapted to be received in the mounting channel 50 in freely pivoting relation. The mounting post 52 is further adapted to be rigidly attached to the soil cultivation machinery on which the tillage implement 10 is mounted, for example by conventional clamping to a mounting bar such as that shown in cross section at 53 in FIGS. 1 and 5.

Means are provided for fixing the vertical location of the knee body 21 on the mounting post 52, and thereby for fixing the relative vertical location of the tillage blade 12 with respect to other parts of the cultivation machinery. Preferably the knee body 21 is so formed that a gap 54 is cut through the mounting channel 50, dividing the mounting channel into two separate parts with an open interval between them. A retention ring 56 is adapted to fit within the gap 54 and to then receive the mounting post 52 as it is engaged in the mounting channel 50. The retention ring 56 has a set screw 58 that may be turned down onto the mounting post 52 to engage it and fix the position of the retention ring thereon, thereby to lock the knee 20 onto the mounting post at a fixed location in freely turning relation.

It is sometimes desirable that the freedom of the knee 20 to turn on the mounting post 52 be confined within selected limits. Preferably the retention ring 56 includes radially extending stop pads 60 adapted to engage the knee body 21 as the retention ring turns with relation to the body beyond a selected point. The desirable range of freedom within which the knee 20 is allowed to turn may vary from application to application. When the tillage blade 12 is a coulter, the positions of the stop pad preferably are so selected that the knee body 21 can turn around the mounting post 52 through an arc not greater than 80° and ideally not greater than 60°.

In use, the tillage implement 10 disclosed above may be mounted on the mounting post 52 at a desired location on the soil cultivation machinery on which it is being used. With the tillage blade 12 engaged with the soil, the knee body 21 pivots on the mounting post 52 so that the tillage blade trails behind the knee body as the cultivation machinery moves. In the event the tillage blade 12 encounters an obstacle, the blade will tend to ride up and over the obstacle if sufficient force is generated by the resistance of the obstacle to the blade to overcome the biasing effect of the spring 40, as is discussed above. By adjustment of the bolt 36, the tension under which the compression spring 40 is held may be changed so as to increase and decrease the degree to which the pivot arm 14 is biased toward its down position and the tillage blade 12 is urged into the soil.

Because the compression spring 40 is enclosed within the spring channel 26 and is closed at its free end 43 by an end cap 42, the tillage implement 10 of the invention can be operated for extended periods of time in even unfavorable conditions without the spring becoming fouled or jammed by trash, mud, or other extraneous material. In the unlikely event that the spring 40 needs to be cleaned or any part of the moving mechanism needs attention for any reason, the cotter pin 25 may be removed, allowing for the convenient removal of the pivot arm 14 from the tillage implement 10 by slipping the knee spindle 22 from the knee spindle hole 24. With the pivot arm 14 removed, direct access is had to the compression spring 40 and the end caps 42, which may simply be lifted out of the spring channel 26. It will be appreciated that there are very few moving parts in the mechanism by which the pivot arm 14 is adjustably biased toward its down position. Besides the pivot arm 14, itself, only the spring 40 with its end caps 42 moves. There is no linkage with cables, levers, rods, or the like to become bent or fouled or to require lubrication. Instead, the tillage implement 10 of the invention provides a simple and efficient structure adapted to survive unfavorable conditions reliably and to be easily serviced, even in the field, with a minimum of tools.

All of the parts of the invention may be made from appropriate metals by conventional metal-working techniques. It is understood that the present invention is not limited to the particular construction and arrangement of parts illustrated and disclosed. Instead, it embraces all such modified forms thereof as come within the scope of the following claims.

What is claimed is:

1. A tillage implement for attachment to agricultural soil cultivation machinery adapted for use in soil including trash, the tillage implement comprising:
   (a) a knee having a unitary knee body having means for attaching the knee to the agricultural machinery and a spring channel having a generally upwardly opening end, the spring channel including means for containing and substantially enclosing a spring, supporting it from below, and thus protecting it from becoming fouled with soil and trash;
   (b) a longitudinally extended pivot arm having a downward end and an upward end, pivotably attached to the knee body at a point between the downward and upward ends, whereby the pivot arm may so pivot that the downward end moves between down and up positions such that the downward end is at positions respectively of greatest descent and assent;
   (c) a tillage blade rotatably attached to the downward end of the pivot arm and adapted to roll over and engage the soil being cultivated; and
   (d) a compression spring contained and supported within the spring channel, whereby it may be resiliently flexed by and resist the application of force from above, the spring having means for applying pressure directly to the pivot arm to bias the downward end thereof toward its down position.

2. The tillage implement of claim 1 wherein the pivot arm is a unitary structure.

3. The tillage implement of claim 1 including an end cap mounted on the spring and presented toward the open end of the spring channel, the end cap including means to close and slideably move within the spring channel to protect the spring and spring channel from becoming fouled with soil and trash, the upward end of the pivot arm being adapted to press directly on the end cap as the movements of the pivot arm compress the spring.

4. The tillage implement of claim 1 wherein the spring channel has a floor remote from its open end adapted to support the spring, the floor having a threaded hole extending therethrough coaxial with the spring channel, and including a bolt threadedly engaged in the threaded hole and adapted to press against and compress the spring to selected degrees as the bolt is turned into and back from the spring channel to adjust the force exerted by the spring on the upward end of the pivot arm.

5. The tillage implement of claim 4 including an end cap mounted on the spring and presented toward the open end of the spring channel, the end cap including means to close and slideably move within the spring channel to protect the spring and spring channel from becoming fouled with soil and trash, the upward end of the pivot arm being adapted to press directly on the end cap as the movements of the pivot arm compress the spring.

6. The tillage implement of claim 2
   wherein the knee body has a knee spindle hole extending therethrough and the pivot arm has a knee spindle pivotably received in the knee spindle hole to pivotably attach the pivot arm to the knee body; and
   wherein the knee body includes first and second stop surfaces and the pivot arm includes a pivot arm contact surface, the first stop surface being adapted to contact the pivot arm contact surface when the tillage blade is moved to its down position to prevent further movement beyond that position and the second stop surface being adapted to contact the pivot arm contact surface when the tillage blade is moved to its up position to prevent further motion beyond that position, the first stop surface and pivot arm contact surface being so located relative to each other and to the longitudinal axis of the knee spindle that the first stop surface extends insufficiently toward the open end of the spring channel to intersect a line drawn from the longitudinal axis of the knee spindle toward the spring channel at a right angle to the first stop surface, and the second stop is so located relative to the longitudinal axis of the knee spindle and the pivot arm contact surface that a line drawn from the longitudinal axis of the knee spindle at a right angle to the second stop surface toward the spring channel passes to that side of the second stop surface remote from the open end of the spring channel.

7. The tillage implement of claim 1
   adapted to be mounted on a vertically extending mounting post and wherein the knee has a mounting channel extending generally vertically through the knee body and adapted to receive the mounting post in freely pivoting relation, the knee body having a gap cut through the mounting channel to divide the mounting channel into two separate parts with an open interval between them; and
   including a retention ring adapted to fit within the gap and to receive the mounting post as it is engaged in the mounting channel, the retention ring having a set screw that may be turned down onto the mounting post to engage it and fix the position of the retention ring thereon, thereby to lock the knee onto the mounting post at a fixed vertical location in freely turning relation.

8. The tillage implement of claim 7 wherein the retention ring includes radially extending stop pads adapted to engage the knee body as the knee body turns with relation to the retention ring through a selected arc.

9. The tillage implement of claim 6 including an end cap mounted on the spring and presented toward the open end of the spring channel, the end cap including means to close and slideably move within the spring channel to protect the spring and spring channel from becoming fouled with soil and trash, the upward end of the pivot arm being adapted to press directly on the end cap as the movements of the pivot arm compress the spring, the spring channel further having a floor remote from its open end and adapted to support the spring, the floor having a threaded hole extending therethrough coaxial with the spring channel; and including a bolt threadedly engaged in the threaded hole and adapted to press against and compress the spring to selected degrees as the bolt is turned into and back from the spring channel to adjust the force exerted by the spring on the upward end of the pivot arm.

10. The tillage implement of claim 9
   adapted to be mounted on a vertically extending mounting post and wherein the knee has a mounting channel extending generally vertically through the knee body and adapted to receive the mounting post in freely pivoting relation, the knee body having a gap cut through the mounting channel to divide the mounting channel into two separate parts with an open interval between them; and including a retention ring adapted to fit within the gap and to receive the mounting post as it is engaged in the mounting channel, the retention ring having a set screw that may be turned down onto the mounting post to engage it and fix the position of the retention ring thereon, thereby to lock the knee onto the mounting post at a fixed vertical location in freely turning relation.

11. The tillage implement of claim 10 wherein the retention ring includes radially extending stop pads adapted to engage the knee body as the knee body turns with relation to the retention ring through a selected arc.

12. A tillage implement adapted to be mounted on a vertically extending mounting post attached to agricultural soil cultivating machinery adapted for use in soil including trash, the tillage implement comprising:

(a) a knee having a unitary knee body, the knee body including a spring channel having a generally upwardly opening open end and a floor remote from the open end, the knee body also having a mounting channel extending generally vertically through the knee body and adapted to receive the mounting post in freely pivoting relation, the knee body having a gap cut through the mounting channel to divide the mounting channel into two separate parts with an open interval between them, the knee body further having a knee spindle hole extending therethrough;

(b) a retention ring adapted to fit within the gap cut through the mounting channel and to receive the mounting post as it is engaged in the mounting channel, the retention ring having a set screw that may be turned down onto the mounting post to engage it and fix the position of the retention ring thereon, thereby to lock the knee onto the mounting post at a fixed vertical location in freely turning relation, the retention ring including radially extending stop pads adapted to engage the knee body as the knee body turns with relation to the retention ring through a selected arc;

(c) a longitudinally extended pivot arm having a downward end and an upward end and a knee spindle extending laterally to the pivot arm, the knee spindle being adapted to be received in freely pivoting relation within the knee spindle hole, the pivot arm being adapted to so pivot about the knee spindle that the downward end moves between down and up positions such that the downward end is at positions respectively of greatest descent and ascent;

(d) a tillage blade rotatably attached to the downward end of the pivot arm and adapted to roll over and engage the soil being cultivated;

(e) a spring mounted in the spring channel, supported by the floor thereof, and substantially enclosed there within, the spring being adapted to apply pressure directly to the pivot arm to bias the downward end thereof toward its down position, the spring being protected by the spring channel from becoming fouled with soil and trash.

13. The tillage implement of claim 12 wherein the knee body includes first and second stop surfaces and the pivot arm includes a pivot arm contact surface, the first stop surface being adapted to contact the pivot arm contact surface when the tillage blade is moved to its down position to prevent further movement beyond that position and the second stop surface being adapted to contact the pivot arm contact surface when the tillage blade is moved to its up position to prevent further motion beyond that position, the first stop surface and pivot arm contact surface being so located relative to each other and to the longitudinal axis of the knee spindle that the first stop surface extends insufficiently toward the open end of the spring channel to intersect a line drawn from the longitudinal axis of the knee spindle toward the spring channel at a right angle to the first stop surface, and the second stop is so located relative to the longitudinal axis of the knee spindle and the pivot arm contact surface that a line drawn from the longitudinal axis of the knee spindle at a right angle to the second stop surface toward the spring channel passes to that side of the second stop surface remote from the open end of the spring channel.

14. The tillage implement of claim 12 including an end cap mounted on the spring and presented toward the open end of the spring channel, the end cap including means to close and slideably move within the spring channel to protect the spring and spring channel from becoming fouled with soil and trash, the upward end of the pivot arm being adapted to press directly on the end cap as the movements of the pivot arm compress the spring.

15. The tillage implement of claim 12 wherein the floor of the spring channel has a threaded hole extending therethrough coaxial with the spring channel, and including a bolt threadedly engaged in the threaded hole and adapted to press against and compress the spring to selected degrees as the bolt is turned into and back from the spring channel to adjust the force exerted by the spring on the upward end of the pivot arm.

* * * * *